(12) United States Patent
Vijayan et al.

(10) Patent No.: US 9,110,602 B2
(45) Date of Patent: *Aug. 18, 2015

(54) CONTENT ALIGNED BLOCK-BASED DEDUPLICATION

(71) Applicant: CommVault Systems, Inc., Oceanport, NJ (US)

(72) Inventors: Manoj Kumar Vijayan, Marlboro, NJ (US); Deepak Raghunath Attarde, Marlboro, NJ (US); Srikant Viswanathan, Eatontown, NJ (US)

(73) Assignee: COMMVAULT SYSTEMS, INC., Oceanport, NJ (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/750,105

(22) Filed: Jan. 25, 2013

(65) Prior Publication Data

US 2013/0232309 A1   Sep. 5, 2013

Related U.S. Application Data

(63) Continuation of application No. 12/982,071, filed on Dec. 30, 2010, now Pat. No. 8,364,652.

(60) Provisional application No. 61/388,531, filed on Sep. 30, 2010.

(51) Int. Cl.
*G06F 17/30* (2006.01)
*G06F 3/06* (2006.01)

(52) U.S. Cl.
CPC ........ *G06F 3/0652* (2013.01); *G06F 17/30156* (2013.01)

(58) Field of Classification Search
None
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |

(Continued)

FOREIGN PATENT DOCUMENTS

| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Son T Hoang
(74) *Attorney, Agent, or Firm* — Knobbe, Martens, Olson & Bear, LLP

(57) ABSTRACT

A content alignment system according to certain embodiments aligns a sliding window at the beginning of a data segment. The content alignment system performs a block alignment function on the data within the sliding window. A deduplication block is established if the output of the block alignment function meets a predetermined criteria. At least part of a gap is established if the output of the block alignment function does not meet the predetermined criteria. The predetermined criteria is changed if a threshold number of outputs fail to meet the predetermined criteria.

17 Claims, 9 Drawing Sheets

(56) References Cited

U.S. PATENT DOCUMENTS

| | | |
|---|---|---|
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,625,793 A | 4/1997 | Mirza |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,425,057 B1 | 7/2002 | Cherkasova et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,557,030 B1 | 4/2003 | Hoang |
| 6,564,228 B1 | 5/2003 | O'Connor |
| 6,658,526 B2 | 12/2003 | Nguyen et al. |
| 6,704,730 B2 | 3/2004 | Moulton et al. |
| 6,757,794 B2 | 6/2004 | Cabrera et al. |
| 6,760,812 B1 | 7/2004 | Degenaro et al. |
| 6,810,398 B2 | 10/2004 | Moulton |
| 6,823,377 B1 | 11/2004 | Wu et al. |
| 6,865,655 B1 | 3/2005 | Andersen |
| 6,952,758 B2 | 10/2005 | Chron et al. |
| 7,028,096 B1 | 4/2006 | Lee |
| 7,065,619 B1 | 6/2006 | Zhu et al. |
| 7,085,904 B2 | 8/2006 | Mizuno et al. |
| 7,103,617 B2 | 9/2006 | Phatak |
| 7,117,246 B2 | 10/2006 | Christenson et al. |
| 7,143,091 B2 | 11/2006 | Charnock |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,383,462 B2 | 6/2008 | Osaki et al. |
| 7,437,388 B1 | 10/2008 | DeVos |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,516,186 B1 | 4/2009 | Borghetti et al. |
| 7,519,726 B2 | 4/2009 | Palliyil et al. |
| 7,539,710 B1 | 5/2009 | Haustein et al. |
| 7,568,080 B2 | 7/2009 | Prahlad et al. |
| 7,581,077 B2 | 8/2009 | Ignatius et al. |
| 7,584,338 B1 | 9/2009 | Bricker et al. |
| 7,613,748 B2 | 11/2009 | Brockway et al. |
| 7,631,194 B2 | 12/2009 | Wahlert et al. |
| 7,657,550 B2 | 2/2010 | Prahlad et al. |
| 7,685,126 B2 | 3/2010 | Patel et al. |
| 7,720,841 B2 | 5/2010 | Gu et al. |
| 7,734,820 B1 | 6/2010 | Ranade et al. |
| 7,747,579 B2 | 6/2010 | Prahlad et al. |
| 7,761,425 B1 | 7/2010 | Erickson et al. |
| 7,797,279 B1 | 9/2010 | Starling et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 8,074,043 B1 | 12/2011 | Zeis |
| 8,145,614 B1 | 3/2012 | Zimran et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,280,854 B1 | 10/2012 | Emmert |
| 8,364,652 B2 | 1/2013 | Vijayan et al. |
| 8,484,162 B2 | 7/2013 | Prahlad et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,621,240 B1 | 12/2013 | Auchmoody et al. |
| 8,930,306 B1 | 1/2015 | Ngo et al. |
| 8,954,446 B2 | 2/2015 | Retnamma et al. |
| 2001/0052015 A1 | 12/2001 | Lin et al. |
| 2002/0107877 A1 | 8/2002 | Whiting et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0115346 A1 | 6/2003 | McHenry et al. |
| 2003/0172130 A1 | 9/2003 | Fruchtman et al. |
| 2003/0174648 A1 | 9/2003 | Wang et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0148306 A1 | 7/2004 | Moulton et al. |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0117558 A1 | 6/2005 | Angermann et al. |
| 2005/0204108 A1 | 9/2005 | Ofek et al. |
| 2005/0216659 A1 | 9/2005 | Ogawa et al. |
| 2005/0243609 A1 | 11/2005 | Yang et al. |

(56) References Cited

U.S. PATENT DOCUMENTS

| | | |
|---|---|---|
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0095527 A1 | 5/2006 | Malik |
| 2006/0101096 A1 | 5/2006 | Fuerst |
| 2006/0167900 A1 | 7/2006 | Pingte et al. |
| 2006/0168318 A1 | 7/2006 | Twiss |
| 2006/0179405 A1 | 8/2006 | Chao et al. |
| 2006/0224846 A1 | 10/2006 | Amarendran et al. |
| 2007/0043757 A1 | 2/2007 | Benton et al. |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0098041 A1 | 4/2008 | Chidambaran et al. |
| 2008/0133561 A1 | 6/2008 | Dubnicki et al. |
| 2008/0159331 A1* | 7/2008 | Mace et al. ............... 370/473 |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0250204 A1 | 10/2008 | Kavuri et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0183162 A1 | 7/2009 | Kindel et al. |
| 2009/0204636 A1* | 8/2009 | Li et al. ............... 707/103 |
| 2009/0204649 A1 | 8/2009 | Wong et al. |
| 2009/0210431 A1 | 8/2009 | Marinkovic et al. |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0036887 A1 | 2/2010 | Anglin et al. |
| 2010/0042790 A1 | 2/2010 | Mondal et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0114833 A1 | 5/2010 | Mu |
| 2010/0169287 A1 | 7/2010 | Klose |
| 2010/0180075 A1 | 7/2010 | McCloskey et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0299490 A1 | 11/2010 | Attarde et al. |
| 2010/0312752 A1 | 12/2010 | Zeis et al. |
| 2010/0318759 A1 | 12/2010 | Hamilton et al. |
| 2011/0113016 A1 | 5/2011 | Gruhl et al. |
| 2011/0119741 A1 | 5/2011 | Kelly et al. |
| 2011/0161723 A1 | 6/2011 | Taleck et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0314400 A1* | 12/2011 | Mital et al. ............... 715/771 |
| 2012/0011101 A1 | 1/2012 | Fang et al. |
| 2012/0078881 A1 | 3/2012 | Crump et al. |
| 2012/0084269 A1 | 4/2012 | Vijayan et al. |
| 2012/0084518 A1 | 4/2012 | Vijayan et al. |
| 2012/0084519 A1 | 4/2012 | Vijayan et al. |
| 2012/0089574 A1 | 4/2012 | Doerner |
| 2012/0150814 A1 | 6/2012 | Retnamma et al. |
| 2012/0150817 A1 | 6/2012 | Retnamma et al. |
| 2012/0150818 A1 | 6/2012 | Retnamma et al. |
| 2012/0150826 A1 | 6/2012 | Retnamma et al. |
| 2012/0150949 A1 | 6/2012 | Retnamma et al. |
| 2012/0233417 A1 | 9/2012 | Kalach et al. |
| 2012/0303622 A1 | 11/2012 | Dean et al. |
| 2013/0290280 A1 | 10/2013 | Prahlad et al. |
| 2013/0339298 A1 | 12/2013 | Muller et al. |
| 2013/0339299 A1 | 12/2013 | Muller et al. |
| 2013/0339300 A1 | 12/2013 | Muller et al. |
| 2013/0339310 A1 | 12/2013 | Muller et al. |
| 2013/0339390 A1 | 12/2013 | Muller et al. |
| 2013/0346373 A1 | 12/2013 | Muller et al. |
| 2014/0032864 A1 | 1/2014 | Vijayan et al. |
| 2014/0201170 A1 | 7/2014 | Vijayan et al. |
| 2014/0201171 A1 | 7/2014 | Vijayan et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/09480 A1 | 2/1999 |
| WO | WO 99/12098 | 3/1999 |
| WO | WO 2010/013292 A1 | 2/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc. "Continuous Data Replicator 7.0," Product Data Sheet, 2007.

CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/

(56) References Cited

OTHER PUBLICATIONS english_US/features/single_instance/single_instance.htm, internet accessed on Jan. 26, 2009, 9 pages.
Diligent Technologies 'HyperFactor, http://www.dilligent.com/products:protecTIER-1:HyperFactor-1, Internet accessed on Dec. 5, 2008, 2 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Jander, "Launching Storage-Area Net," Data Communications, US, McGraw Hill, NY, vol. 27, No. 4(Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).

International Search Report and Written Opinion, International Application No. PCT/US2009/58137, Mail Date Dec. 23, 2009, 14 pages.
International Search Report and Written Opinion, International Application No. PCT/US2011/030804, mailed Jun. 9, 2011.
International Search Report and Written Opinion, International Application No. PCT/US2011/030814, mailed Jun. 9, 2011.
Bhagwat, Extreme Binning: Scalable, Parallel Deduplication for Chunk-based File Backup. IEEE 2009, 9 pages.
Cohen, Edith, et al., "The Age Penalty and Its Effect on Cache Performance." In USITS, pp. 73-84. 2001.
Cohen, Edith, et al.,."Aging through cascaded caches: Performance issues in the distribution of web content." in ACM SIGCOMM Computer Communication Review, vol. 31, No. 4, pp. 41-53. ACM, 2001.
Cohen, Edith, et al.,. "Refreshment policies for web content caches." Computer Networks 38.6 (2002): 795-808.
Dubnicki, et al. "HYDRAstor: a Scalable Secondary Storage." Fast. vol. 9.2009, 74 pages.
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.

\* cited by examiner

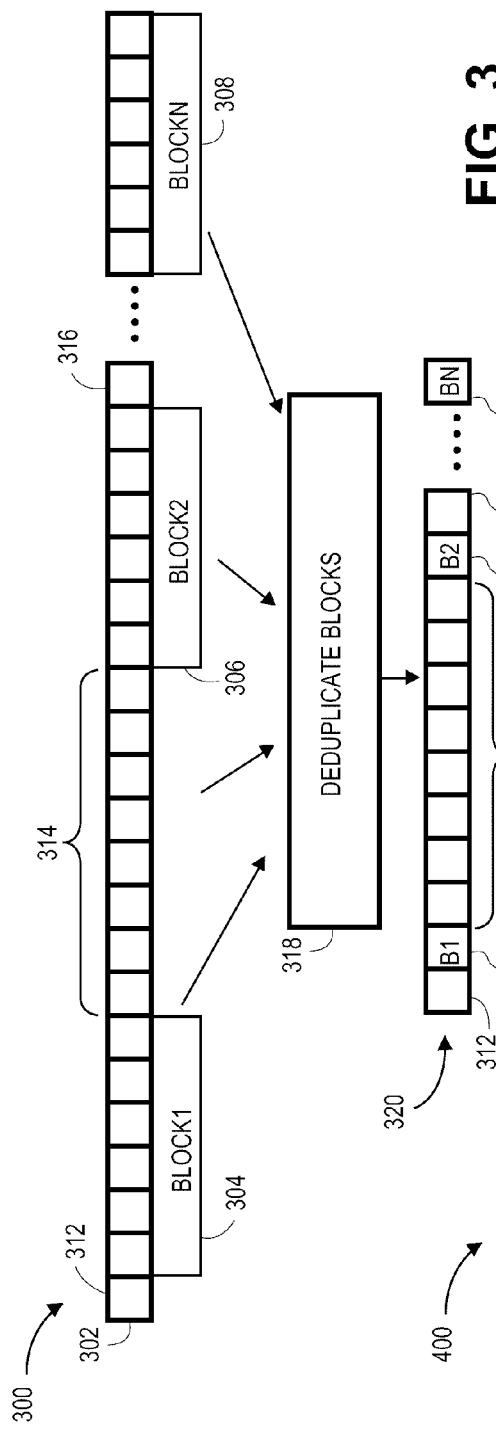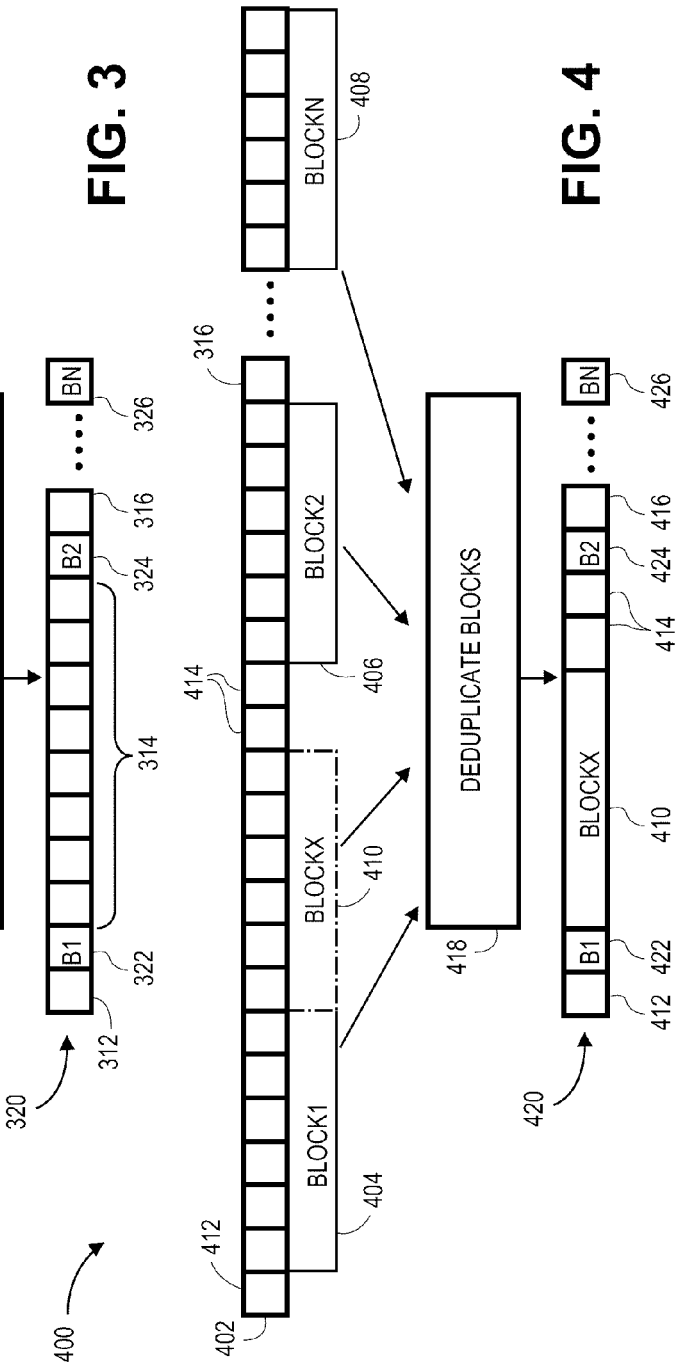

CONTENT ALIGNED BLOCK-BASED DEDUPLICATION

CROSS-REFERENCE TO RELATED APPLICATION

This application is a continuation of U.S. patent application Ser. No. 12/982,071, filed on Dec. 30, 2010, and entitled "CONTENT ALIGNED BLOCK-BASED DEDUPLICATION," which claims the benefit of priority under 35 U.S.C. §119(e) of U.S. Provisional Patent Application No. 61/388,531, filed on Sep. 30, 2010, and entitled "CONTENT ALIGNED BLOCK-BASED DEDUPLICATION," the disclosure of which is hereby incorporated by reference in its entirety.

BACKGROUND

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

As such, enterprises are generating ever increasing volumes of data and corresponding storage requirements. Moreover, enterprise storage systems are typically distributed over one or more networks, such as where backup storage is remote from client computers. In such situations, storage system activity can place heavy demands on available network bandwidth.

SUMMARY

In response to these challenges, one technique developed by storage system providers is data deduplication. Deduplication typically involves eliminating or reducing the amount of redundant data stored and communicated within a storage system, improving storage utilization. For example, a data segment can be divided into units of a chosen granularity (e.g., files or data blocks). As new data segments enter the system, the data units can be checked to see if they already exist in the storage system. If the data unit already exists, instead of storing and/or communicating a duplicate copy, the storage system stores and/or communicates a reference to the existing data unit. Thus, deduplication can improve storage utilization, system traffic (e.g., over a networked storage system), or both.

One method of dividing the data segment into units is to use fixed-size blocks at fixed-intervals. As an example, a 1 MB data segment can be subdivided into eight 128 kB blocks. Each of the 128 kB blocks is compared to each other as well as other 128 kB blocks within the storage system in order to identify all the identical blocks. However, if a data block differs from previously stored data blocks by just one byte, the result may be no matching data blocks are found, and no data is deduplicated, even though all the data is identical except the one byte.

In view of the foregoing a need exists to more efficiently determine the appropriate alignment for each block of data, thereby increasing the amount of data that is deduplicated and decreasing storage requirements. According to certain aspects, a sliding window alignment function is performed on data segments to establish block alignments based on the content of the data. The established data blocks can be fixed length, for example. In some embodiments, gaps of data not belonging to any deduplicated blocks exist between the deduplicated data blocks.

In determining the appropriate alignment some type of predetermined criteria is generally used. Using different criteria in some circumstances can dramatically affect the number of blocks that are deduplicated. Thus, according to certain embodiments, the predetermined criteria is dynamically refined during the deduplication process, providing improved storage utilization.

In certain embodiments, a method is disclosed for defining deduplication block alignments within a data segment. The method includes iteratively performing a deduplication block alignment function on data within a sliding window in a data segment. For each iterative performance of the deduplication block alignment function, the method further includes in response to determining that the output of the deduplication block alignment function performed on the data within the sliding window satisfies a predetermined criteria establishing with one or more computer processors a deduplication data block having a predetermined block size. For each iterative performance of the deduplication block alignment function, the method further includes in response to determining that the output of the deduplication block alignment function performed on the data within the sliding window does not satisfy the predetermined criteria defining at least a portion of a gap of data not belonging to a deduplication data block.

In certain embodiments, a system is disclosed for defining deduplication block alignments within a data segment. The system comprises a deduplication block alignment module executing in one or more processors and configured to iteratively perform a deduplication block alignment function on data within a sliding window in a data segment. The block alignment module is further configured for each iterative performance of the block alignment function to establish a deduplication block having a predetermined block size in response to determining that the output of the deduplication block alignment function performed on the data within the sliding window satisfies a predetermined criteria. The block alignment module is further configured for each iterative performance of the block alignment function to define at least a portion of data not belonging to a deduplication block in response to determining that the output of the block alignment function performed on the data within the sliding window does not satisfy the predetermined criteria, for each iterative performance of the block alignment function.

In certain embodiments, a method is disclosed for defining deduplication block alignments within a data segment. The method includes iteratively performing a block alignment function on data within a sliding window in a data segment. For each iterative performance of the alignment function, the method further includes establishing with one or more computer processors a deduplication data block having a predetermined block size and moving the sliding window relative to the data segment by an amount based on the predetermined block size before performing the next iteration in response to determining that the output of the block alignment function performed on a current window of data satisfies a predetermined criteria. For each iterative performance of the alignment function, the method further includes in response to determining that the output of the block alignment function performed on the current window of data does not satisfy the predetermined criteria moving the sliding window relative to the data segment by an incremental amount before performing the next iteration and without establishing a deduplication data block, wherein gaps of data not belonging to any deduplication data block exist between established deduplication data blocks following performance of the block alignment function across the data segment.

In certain embodiments, a method is disclosed for determining deduplication block alignments within a data segment. The method includes selecting a first range of possible output values of a deduplication block alignment function which indicate that a block alignment has been found and iteratively performing the deduplication block alignment function on data within a sliding window in a data segment. For each iterative performance of the alignment function, the method further includes determining with one or more computer processors whether the output of the deduplication block alignment function performed on the data within the sliding window falls within the first range. For each iterative performance of the alignment function, the method further includes establishing with one or more computer processors a deduplication data block having a predetermined block size in response to determining that the output of the block alignment function falls within the first range. The method further includes selecting a second range of output values for the block alignment function which indicate that a block alignment has been found, the selection of the second range performed in response to determining, for a threshold number of iterations, that the output of the block alignment does not fall within the first range, wherein the second range is used instead of the first range for subsequent iterations of the block alignment function.

In certain embodiments, a deduplication system is disclosed for configured determining deduplication block alignments within a data segment. The system includes a block alignment module executing in one or more processors. The block alignment module is configured to select a first range of output values for a deduplication block alignment function which indicate that a block alignment has been found, and iteratively perform the deduplication block alignment function on data within a sliding window in a data segment. The block alignment module is further configured for each iterative performance of the block alignment function to determine whether the output of the deduplication block alignment function performed on data within the sliding window falls within the first range, and establish a deduplication data block with a predetermined block size in response to determining that the output of the deduplication block alignment function performed on the data within the sliding window falls within the first range. The system further includes a criteria adjustment module configured to select a second range of output values for the block alignment function which indicate that a block alignment has been found, the selection of the second range in response to the block alignment module determining, for a threshold number of iterations, that the output of the block alignment performed on the data within the sliding window does fall within the first range, wherein the second range is used instead of the first range for subsequent iterations of the block alignment function.

In certain embodiments, a method is disclosed for refining criteria for determining deduplication block alignments within a data segment. The method includes selecting a first range of output values for a deduplication block alignment function which indicate that a block alignment has been found, and iteratively performing a block alignment function on data within a sliding window in a data segment. For each iterative performance of the alignment function, the method further includes in response to determining with one or more computer processors whether the output of the block alignment function performed on a current window of data falls within the first range establishing a deduplication data block having a predetermined block size, and moving the sliding window in a first direction relative to the data segment by an amount based on the predetermined block size before performing the next iteration. For each iterative performance of the alignment function, the method further includes in response to determining that the output of the block alignment function performed on the current window of data does not fall within the first range for a threshold number of iterations, selecting a second range of output values for the block alignment function which indicate that a block alignment has been found, and moving the sliding window over data relative to the data segment in a second direction opposite the first direction before performing the next iteration using the second range, wherein the next iteration is performed on data on which the block alignment function was previously performed using the first range.

DESCRIPTION OF THE DRAWINGS

FIGS. 3 and 4 are block diagrams illustrative of other examples data segments during deduplication in accordance with embodiments described herein.

DETAILED DESCRIPTION

Figure 1:
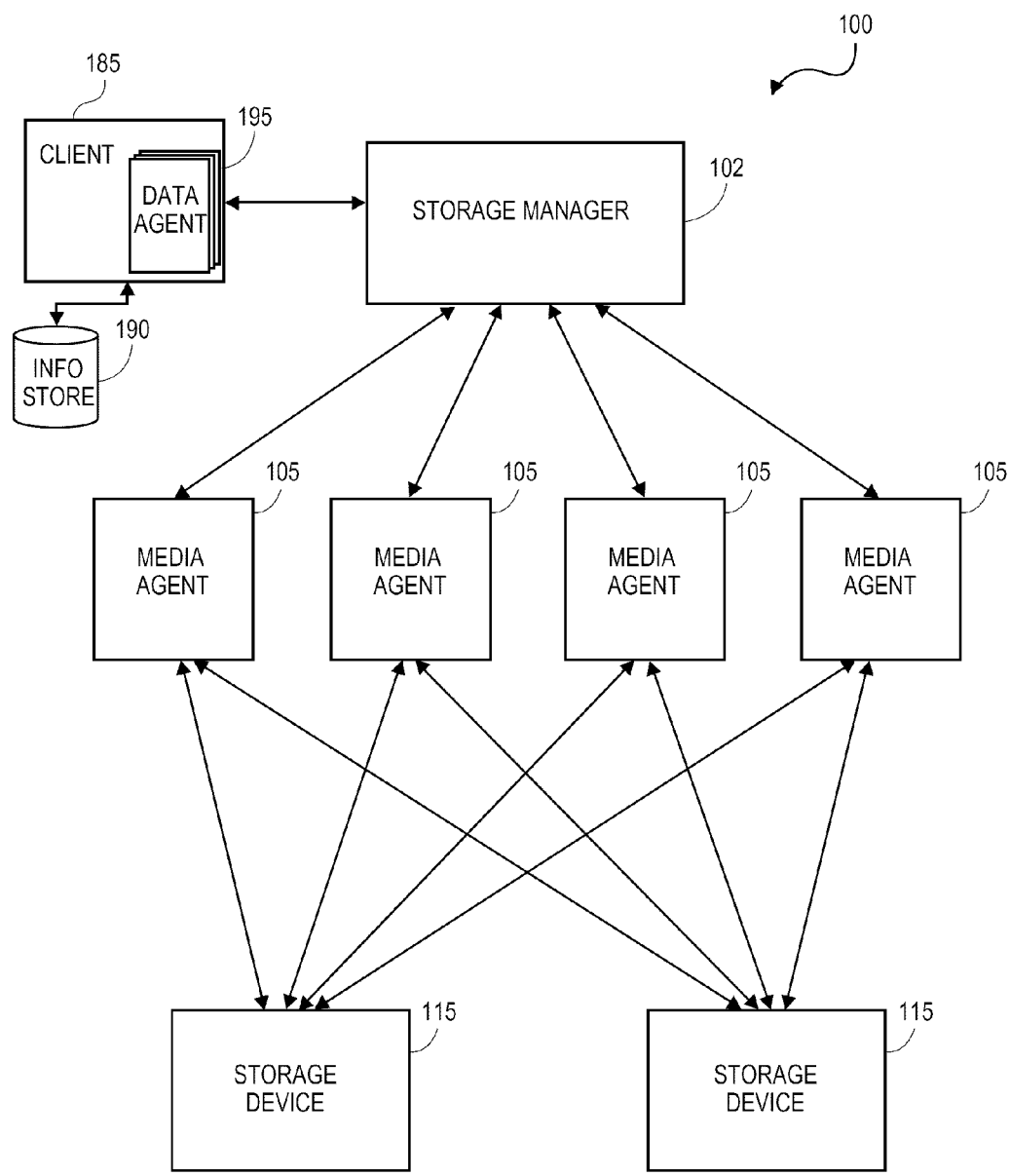
FIG. 1 is a block diagram that illustrates components of an example storage system configured to implement techniques compatible with embodiments described herein.

Generally described, the present disclosure is directed to a system, method, and computer-readable non-transitory storage medium for defining deduplication block alignments within a data segment and deduplicating data blocks within a data segment. Specifically, aspects of the disclosure will be described with regard to iteratively determining block alignments for a data segment that is to be deduplicated. Although various aspects of the disclosure will be described with regard to examples and embodiments, one skilled in the art will appreciate that the disclosed embodiments and examples should not be construed as limiting.

As described above, determining the alignment of deduplication blocks based on the content of the data according to techniques described herein can significantly increase the probability that the data will be deduplicated, and that a data segment will use less storage. The present disclosure describes certain embodiments that determine the alignment of deduplication blocks using a block alignment function. A sliding window moves across the data segment and the block alignment function is performed on the data in the sliding window. Deduplication blocks are formed when the output of the block alignment function meets predetermined criteria, which may also be referred to as a "hit." Gaps, or parts of gaps, are formed when the output of the block alignment function does not meet predetermined criteria i.e. when there is no "hit."

After the sliding window has moved across the data segment, the data segment includes deduplication blocks and gaps between some or all of the deduplication blocks. The deduplication blocks can be a fixed-size or variable-size. The gaps between the deduplication blocks will likely vary in size. The size of the gaps are reflective of the number of iterations between the block alignment function returning hits. An example, this will be described in greater detail below with reference to FIG. 5.

The deduplication blocks are then compared with each other and other previously stored deduplication blocks to determine if they contain identical data. The gaps, however, may not under go this deduplication process. After the deduplication blocks are compared, the deduplication blocks with identical data as other deduplication blocks are replaced with references, often pointers, to the other deduplication blocks. The remaining data segment includes the gaps, references to the deduplication blocks with identical data, and the deduplication blocks that did not have identical data stored elsewhere. Such techniques generally provide improved storage utilization in an efficient manner.

By dynamically aligning the deduplication blocks, the storage system will increase the likelihood of finding identical data, which can then be replaced with a reference to the other stored data. Thus, the amount of memory required to store the data segment can be significantly reduced, leading to significant cost-savings for enterprises.

In addition, the description includes embodiments for altering, or tuning, the predetermined criteria during the block alignment phase based on the data. As the sliding window moves across the data, the storage system can determine that there are insufficient hits using the current block alignment function. The storage system can modify the predetermined criteria to increase the likelihood of hits and/or modify the block alignment function. Thus, the storage system can dynamically adapt to the data segment, further leading to an increased probability of finding identical data and reducing the amount of memory used by the data segment. In the present disclosure, a data segment can generally refer to a set of data that includes smaller components. A data segment may be of any size, and may be in the form of stored data or streaming data. A data segment may take the form of parts of a file, an entire file, or multiple files.

In the present disclosure, a sliding window can generally refer to a boundary used to analyze different parts of a data segment.

In the present disclosure, a block alignment function can generally refer to any type of function that can be used to determine block alignments. A specific example of a block alignment function is a hash function, particularly weak hash functions.

In the present disclosure, a block comparison function can generally refer to any type of function capable of comparing two different sets of data within a data segment. A block comparison function may be as simple as comparing each bit, or byte, of data from one set of data to each bit, or byte, of data form another set of data. A more complex type of block comparison function involves comparing hash function values of blocks, particularly those of strong hash functions.

In the present disclosure, deduplication can generally refer to identifying and removing duplicative data within a data segment. Deduplication may refer to the identifying step, the removing step, or both.

Illustrative explanations of several terms used throughout the disclosure are provided above. While these meanings apply to the respective terms as used with respect to certain embodiments, it will be appreciated that the meanings can vary depending on the embodiment. Additionally, the meanings of these and other terms used herein will be understood in view of their usage throughout the entirety of the disclosure.

FIG. 1 illustrates a block diagram of an example network storage architecture compatible with embodiments described herein. The system 100 is configured to perform storage operations on electronic data in a computer network. As shown, the storage system 100 includes a storage manager 102 and one or more of the following: a client 185, an information store 190, a data agent 195, a media agent 105, an index cache 110, and a storage device 115.

A data agent 195 can be a software module that is generally responsible for archiving, migrating, and recovering data of a client computer 185 stored in an information store 190 or other memory location. Each client computer 185 has at least one data agent 195 and the storage system 100 can support many client computers 185. The storage system 100 provides a plurality of data agents 195 each of which is intended to backup, migrate, and recover data associated with a different application. For example, different individual data agents 195 may be designed to handle Microsoft Exchange™ data, Microsoft Windows file system data, and other types of data known in the art. If a client computer 185 has two or more types of data, one data agent 195 may be implemented for each data type to archive, migrate, and restore the client computer 185 data.

The storage manager 102 is generally a software module or application that coordinates and controls the system. The storage manager 102 communicates with all elements of the storage system 100 including client computers 185, data agents 195, media agents 105, and storage devices 115, to initiate and manage system backups, migrations, recoveries, and the like.

A media agent 105 is generally a software module that conducts data, as directed by the storage manager 102, between locations in the storage system 100. For example, the media agent may conduct data between the client computer 185 and one or more storage devices 115, between two or more storage devices 115, etc. The storage devices 115 can include a tape library, a magnetic media storage device, an optical media storage device, or other storage device. Although not shown in FIG. 1, one or more of the media agents 105 may also be communicatively coupled to one another.

Each of the media agents 105 can be communicatively coupled with and control at least one of the storage devices 115. The media agent 105 generally communicates with the storage device 115 via a local bus. In some embodiments, the storage device 115 is communicatively coupled to the media agent(s) 105 via a Storage Area Network ("SAN").

Further embodiments of storage systems such as the one shown in FIG. 1 are described in application Ser. No. 10/818, 749, now U.S. Pat. No. 7,246,207, issued Jul. 17, 1007, which is incorporated by reference herein. In various embodiments, components of the storage system 100 may be distributed amongst multiple computers, or one or more of the components may reside and execute on the same computer.

Furthermore, components of the storage system 100 of FIG. 1 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of storage system 100 may be configured for deduplication. For example, one or more of the clients 185 can include a deduplicated database (DDB). The data stored in the storage devices 115 may also be deduplicated. For example, one or more of the media agents 105 associated with the respective storage devices 115 can manage the deduplication of data in the storage devices 115.

Figure 2:
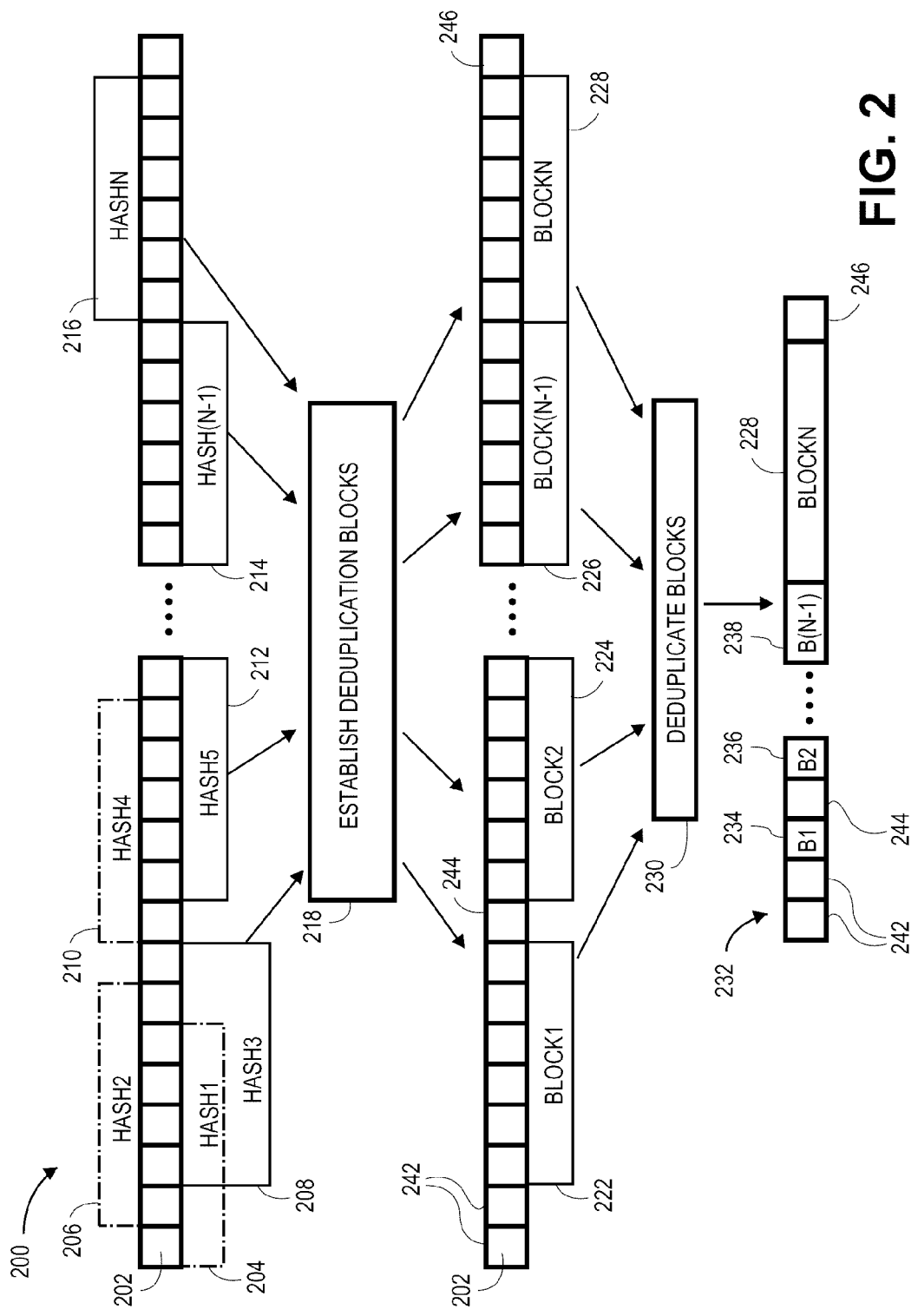
FIG. 2 is a block diagram illustrative of an example data segment during deduplication in accordance with embodiments described herein.

FIG. 2 is a block diagram illustrative of a data segment 200 during deduplication. The deduplication techniques described with respect to FIG. 2 may be performed by any number of different components of storage system 100, described above with reference to FIG. 1, or some other storage system. For example, deduplication may be performed by the client 185, data agent 195, storage manager 102 any one of the media agents 105. Furthermore, the deduplication may be performed on streaming data being sent to or from the client 185, storage manager 102, and/or media agent 105. Deduplication can also be performed on data residing in any of the client 185, storage manager 102, media agents 105, and/or storage devices 115. In one example scenario, one or more of the storage devices 115 comprise backup storage, and the media agents 105 generally manage deduplication of backup data that is stored on the storage devices 115. Generally, any of the block alignment techniques described herein such as those described with respect to any of FIGS. 2-10 may be performed by a deduplication block alignment module executing on one or more of the components in the system. For example, a block alignment module may be implemented on the storage manager, one or more of the media agents, or a combination thereof.

As shown in FIG. 2, a data segment 200 may be made up of any number of data subcomponents 202. For ease of reference, each data subcomponent 202 in the example of FIG. 2 represents one byte of information, however, the data subcomponents 202 can take any number of different forms such as bits, bytes or multiples thereof. As discussed previously the data segment 200 may be streaming data or stored in computer memory. The data segment may comprise a file, multiple files or a portion of a file.

As part of deduplication, a block alignment function is performed on one or more data subcomponents 202 within the data segment 200. A sliding window can be used to determine what data is to be used. The sliding window may be any number of sizes. For example, in various embodiments, the sliding window can be 32 kilobytes (kB), 64 kB, 128 kB, or some smaller or larger value. In the example of FIG. 2, the sliding window covers six subcomponents of data, or six bytes. Thus, there are six bytes of data within the sliding window at any given time. However, it is to be understood that the sliding window may be any size, and the example illustrated in FIG. 2 is not to be construed as limiting. The sliding window may also vary in size as it moves relative to the data segment.

The block alignment function used can be any number of different functions to determine an appropriate alignment for a deduplication block. In the example of FIG. 2, a hash function is used. In other embodiments, the block alignment function may comprise or output a message digest, checksum, digital fingerprint, digital signature or other sequence of bytes that substantially uniquely identifies the relevant data block. When a hash function is used, the hash function returns a value for the data within the sliding window. As illustrated in FIG. 2, a first hash 204 is performed on the data at the beginning of the data segment 200, which is within the sliding window. The first hash, or hash1, 204 returns a hash value. The hash value is then compared with a predetermined range of values. If the hash value falls within the predetermined range a deduplication block is established, as illustrated at 218. While the example system described with respect to FIG. 2 compares the hash value to a predetermined range, the system may evaluate the hash to determine whether it meets a variety of predetermined criteria, as will be discussed in greater detail herein.

The size of the deduplication blocks 222, 224, 226, 228 in the illustrated embodiment correspond with the size of the sliding window (e.g., six bytes). If the hash value does not fall within the predetermined range then the sliding window moves relative to the data segment by an incremental value. In this example, the incremental value is representative of one data subcomponent 202, or one byte. However the incremental value can be larger or smaller than one subcomponent. For example, the incremental value could be one bit, byte, or multiples thereof.

Once the sliding window moves relative to the data segment 200, another hash is performed on the data that is within the sliding window after the move. As illustrated in FIG. 2, the data in the second hash, or hash2, 206 is similar to the data in the first hash 204 except that the second byte of data in the first hash 204 is the first byte of data in the second hash. In addition, the last byte of data in the first hash 204 is the second-to-last byte of data in the second hash 206. In other words, in the example illustrated in FIG. 2 the sliding window moves relative to the data segment to the right by one byte, which represents the incremental value in this example. The second hash returns a hash value which is compared with the predetermined range. Once again, if the hash value falls within the predetermined range, a deduplication block is established 218. If not, the sliding window slides by one incremental value, i.e. one byte. The process is continued until a hash returns a value that falls within the predetermined range, or until the sliding window has moved across the entire data segment 200. Returning a hash value within the predetermined range can also be referred to as a "hit". A hit occurs in FIG. 2 with the third hash, or hash3, 208.

In the example illustrated in FIG. 2, the third hash 208 returns a hit within the predetermined range, and block1 222 is established based on the hit. Block1 222 designates the data that returned the hit, and is the same size as the sliding window. However, it is envisioned that the deduplication block size can vary from the sliding window size. In this example the data that returned the hit begins at the third byte and ends at the eighth byte. Thus, block1 222 is made up of six bytes and similarly begins at the third byte and ends at the eighth byte. The example illustrated in FIG. 2 shows that additional hits occurred at the hash5 212, hash(N−1) 214 and hashN 216. From those hits block2 224, block(N−1) 226, and blockN 228 are established, respectively.

With continued reference to FIG. 2, after the block alignment function has performed on the entire data segment 200, data segment 200 has at least four deduplication blocks: block1 222, block2 224, block(N−1) 226, and blockN 228. In addition to the deduplication blocks, data segment 200 contains gaps between some of the deduplication blocks. The gaps between deduplication blocks represent unsuccessful hashes, or hashes that did not return a hit. For instance, gap 242 is made up of two bytes associated with hash1 and hash2, which did not return hits. Gap 244 is made up of one byte, associated with hash4, which also did not return a hit. Gap 246 represents leftover data that could not become part of a deduplication block after blockN 228 was established because there was insufficient data left to establish another deduplication block.

As discussed, in other embodiments the deduplication blocks may be larger or smaller than the sliding window. As one illustrative example, the deduplication system performs a hash function on a 64 kB sliding window of data and creates a 128 kB deduplication block. In some embodiments, one or more of the size of the deduplication data blocks and the size of the sliding window may be configurable, either manually by a user, or automatically by the deduplication system itself. For example, the size of the blocks or the size of the sliding window may be adjusted based on a measured deduplication ratio or other appropriate parameter.

As shown, the system may align the starting point of the deduplication blocks 222, 224, 226, 228 at the beginning of the respective sliding window. For example, the deduplication block 222 begins at the third byte of data, which corresponds to the first byte of the sliding window of data on which the hash3 208 was performed. In other embodiments, the deduplication block alignment starting points can be placed at some other position relative to the sliding window. For example, the system can align the starting point of the deduplication blocks at some other point within the sliding window (e.g., in the middle of the sliding window). In yet other instances, the beginning of the deduplication blocks is defined at some point outside of the sliding window. For example, in one embodiment, the system establishes deduplication blocks such that they begin at a position in the data segment 200 before the respective sliding window. The deduplication blocks in such an embodiment can extend from this starting alignment to include some or all of the data within the sliding window.

Moreover, the data blocks can extend beyond the sliding window. For example, in the above embodiment where the deduplication system performs a hash function on a 64 kB sliding window of data and creates a 128 kB deduplication block, the deduplication block can extend beyond the sliding window, depending on the starting alignment. For instance, where such a block is aligned at the beginning of the sliding window, the block extends 64 kB beyond the sliding window.

Once the deduplication blocks for the data segment have been established, the deduplication blocks are deduplicated. To deduplicate the blocks a block comparison function can be performed on the different deduplication blocks. For example, the block comparison function can compare each byte of data in each deduplication block. Alternatively, the block comparison function can be a hash function. Thus, a hash function, different from the hash function used to establish the deduplication blocks, can be used to compare the deduplication blocks. Similar to what is described above, the hash function for each block returns a hash value. The hash value of each deduplication block can be compared. If the hash function of two deduplication blocks returns the same hash value, it is highly probable that the two deduplication blocks contain equivalent data. Thus, the data of one of the deduplication blocks can be removed from the data segment and replaced with a reference to the other deduplication block. In this way, the amount of data stored in the data segment can be reduced. In addition, the hash values of the deduplication blocks of the data segment can be compared with hash values of deduplication blocks from other data segments. While comparing the hash values of the deduplication blocks of the data segment with the hash values of deduplication blocks from other data segments can increase complexity and require additional resources, it can also increase the likelihood of finding equivalent hash values.

In the example illustrated in FIG. 2, an equivalent hash value is found for the hash value of block1 222, block2 224 and block(N−1) 226. Thus, the data of block1 222, block2 224 and block(N−1) 226 is replaced with references B1 234, B2 236, and BN−1 238. The equivalent hash value can be the same or different for each of block1 222, block2 224 and block(N−1) 226. In addition, no equivalent hash value was found for BlockN 228. Thus, the data of blockN 228 is not replaced with a reference and blockN 228 remains as part of the deduplicated data segment 232. Thus, in the example illustrated in FIG. 2, after the deduplication process, data segment 232 contains gap 242, reference B1 234, gap 244, reference B2 236, reference BN−1 238, blockN 228 and gap 246.

Although not illustrated in FIG. 2, deduplication blocks for the entire data segment need not be created before the blocks are deduplicated. For example, once hash1 204 returns a hit, block1 222 can be created and immediately deduplicated. In other words, prior to hash4 210, the storage system can compare the hash value of block1 222 with the hash value of other deduplication blocks to determine if block1 222 can be replaced with reference B1 234. In various embodiments, deduplication occurs after creating deduplication block alignments for multiple blocks, an entire segment, multiple segments, a file comprised of multiple segments, or some other granularity of data. Thus, the process for establishing deduplication blocks and deduplicating data segments can occur in any number of ways without departing from the spirit and scope of the disclosure.

In another embodiment, the storage system moves the sliding window relative to the data segment, and performs the block alignment function for all potential deduplication blocks before determining if the output of the block alignment function for the potential deduplication blocks meets the predetermined criteria. In such an embodiment, the storage system can evaluate the different outputs to determine the criteria to be used as the predetermined criteria. In this way, the storage system can potentially reduce the number of gaps within the deduplication blocks.

Because the gaps 242, 244, 246 of data are not included in a deduplication block, the gaps 242, 244, 246 generally represent data in the data segment that is not used in the deduplication process. However, the blocks are aligned according to the alignment function based on the content of the data, improving the odds that the deduplication blocks will be redundant. Thus, while all of the data may not be used in the deduplication process, the overall storage utilization is improved according to embodiments described herein. Moreover, in certain embodiments, the deduplication blocks all have the same, fixed length. Using fixed length blocks can reduce the computational overhead involved in creating and comparing deduplication blocks for redundancies and/or simplify the management and storage of the deduplication blocks once created, among providing other advantages.

FIG. 3 illustrates another example of a data segment 300 during duplication. In the example illustrated in FIG. 3, the block alignments have already been determined i.e. the deduplication blocks and gaps have already been established. In FIG. 3, after the block alignments have been established, the data segment 300 is contains gap 312, block1 304, gap 314, block2 306, gap 316 and blockN 308. Similar to FIG. 2, the gaps between deduplication blocks represent hashes that did not return values within the predetermined range, or outputs of the block alignment function that did not meet the predetermined criteria. Thus, between block1 304 and block2 306 there were several unsuccessful hashes occurred, which resulted in gap 314.

Also similar to FIG. 2, FIG. 3 shows the data segment 300 after deduplication, represented as deduplicated segment 320. The deduplicated segment 320 is contains gap 312, reference B1 322, gap 314, reference 324, gap 316 and reference BN. As discussed earlier, the references refer to other deduplication blocks that contain data equivalent to the data in the deduplication blocks corresponding to the references. Thus, during deduplication, a second hash function of block1 304, block2 315 and blockN 308 return a hash value equivalent to a hash value of another deduplication block. Thus, block1 304, block2 315 and blockN 308 are replaced with references to the deduplication block with the equivalent hash value. It should be noted that block1 304, block2 315 and blockN 308 may each be equivalent to the same or different deduplication blocks and references B1 322, B2 324, and BN 326 may all refer to different deduplication blocks or the same deduplication block.

FIG. 4 illustrates another example of a data segment 400 after the block alignments have already been determined. In the example illustrated in FIG. 4, the initial block alignment function resulted in block1 404, block2 406 and blockN 408. A large gap, similar to gap 314 of FIG. 3 is established. However, to reduce the number of gaps, a storage system can determine that once a gap is as large as a deduplication block, a deduplication block should be established from the gap. This determination and establishment of an additional deduplication block is illustrated with blockX 410. In the example illustrated in FIG. 4, the storage system determines that the gap between block1 404 and block2 406 is large enough to allow the establishment of blockX 410, despite that there were no hits between block1 404 and block2 406. To accomplish this, the storage system tracks the number of unsuccessful hits. Once the number of hits reaches some threshold, the storage system can establish the deduplication block.

In the example illustrated in FIG. 4, the deduplicated data segment 420 contains gap 412, reference B1 422, blockX 410, 414, reference B2 424, gap 416 and reference BN 426. Thus, in the example illustrated in FIG. 4, during the block comparison function, there was not another block that returned a hash value equal to that of blockX 410. Similar to the deduplicated segments illustrated in FIG. 2 and FIG. 3, each of the references B1 422, B2 424 and BN 426 refer to deduplication blocks with data equivalent to that found in block1 404, block2 406 and blockN 408, respectively. In the example illustrated in FIG. 4, the references B1 422, B2 424 and BN 426 can refer to deduplication blocks in other data segments or can point to blockX 410. In another scenario, the system does find a hit for blockX when deduplicating the blocks 418, and the deduplicated segment 420 therefore includes a reference to blockX instead of blockX itself.

FIG. 4 can also be used to illustrate another function that can be performed on data segment 402. As the sliding window moves relative to the data segment 400, a counter can be used to track the number of times a hash does not return a hit. If a threshold number of hashes fails to return a hit the predetermined range or other criteria can be adjusted. In one embodiment, adjusting the predetermined criteria can include expanding the range of values considered to be a hit. In another embodiment, the block alignment function can be changed entirely. In another embodiment, the sliding window size can be adjusted. To determine how to expand the range of values, or otherwise change the predetermined criteria, the hash values of previous hashes can be examined. Thus, in the example illustrated in FIG. 4, block1 404 returns a hit, but the following several hashes fail to return a hit. The storage system analyzes the hash values of the previous unsuccessful hashes and expands, or otherwise adjusts the range to increase the hits. In the example illustrated in FIG. 4, a threshold of six no-hits is used. In other words, after six iterations without returning a hit, the storage system can adjust the range of values considered to be a hit. In the example illustrated in FIG. 4, after block1 404, six hashes are performed, all of which fail to return a hit. The storage system analyzes the values of the hits and adjusts the range so that at least one additional hit occurs. Adjusting the range results in blockX 410 being established. After adjusting the range of values, the sliding window continues. In one embodiment, after adjusting the predetermined criteria, the storage system can move the sliding window relative to the data segment to the beginning of the data segment to re-analyze the hashes in light of the changed criteria. In another embodiment, after the adjusting the predetermined criteria, the storage system can reevaluate the hash values of the previous hashes and establish any new deduplication blocks in light of the reevaluation before continuing. Additionally, in embodiments where the range of hash values is expanded, the modified range includes the values that were in the original range and there is thus a relatively high probability of finding a matching suitable block boundary.

Continuing on with the example of FIG. 4, at least two additional hits occur with block2 406 and blockN 408. In another embodiment, once the predetermined criteria is adjusted, the sliding window can return to the beginning of the data segment 400. In an embodiment where the block alignment function is adjusted, the sliding window can begin at the beginning of the data segment. In an alternative embodiment, once the predetermined criteria is adjusted, only some of the data is reevaluated. Depending on the embodiment, the initial and refined predetermined ranges (or other criteria) can differ. As one illustrative example, the block alignment function is a hash function that outputs at 16-bit value having 65,536 possible values. An intermediate function such as a modulo or other operation can be performed on the output values. For example, the intermediate function may reduce the number of values that are analyzed in the block alignment determination. For example, a modulo-100 operation is performed such that each analyzed value is from between 0 and 99. The first predetermined range in the example scenario is from 45 to 55. Where the criteria is adjusted as described herein, the second predetermined range is from 40 to 60. It will be appreciated that the number of output values, the intermediate function, the first range and/or the second range can vary. In other embodiments, the first range and the second range do not overlap or only partially overlap. Moreover, the range may be adjusted more than once in certain embodiments to a third refined range, fourth refined range, etc., or may revert back to previous ranges. Moreover, a modulo function is not used in some cases, or a different intermediate function is used.

Figure 5:
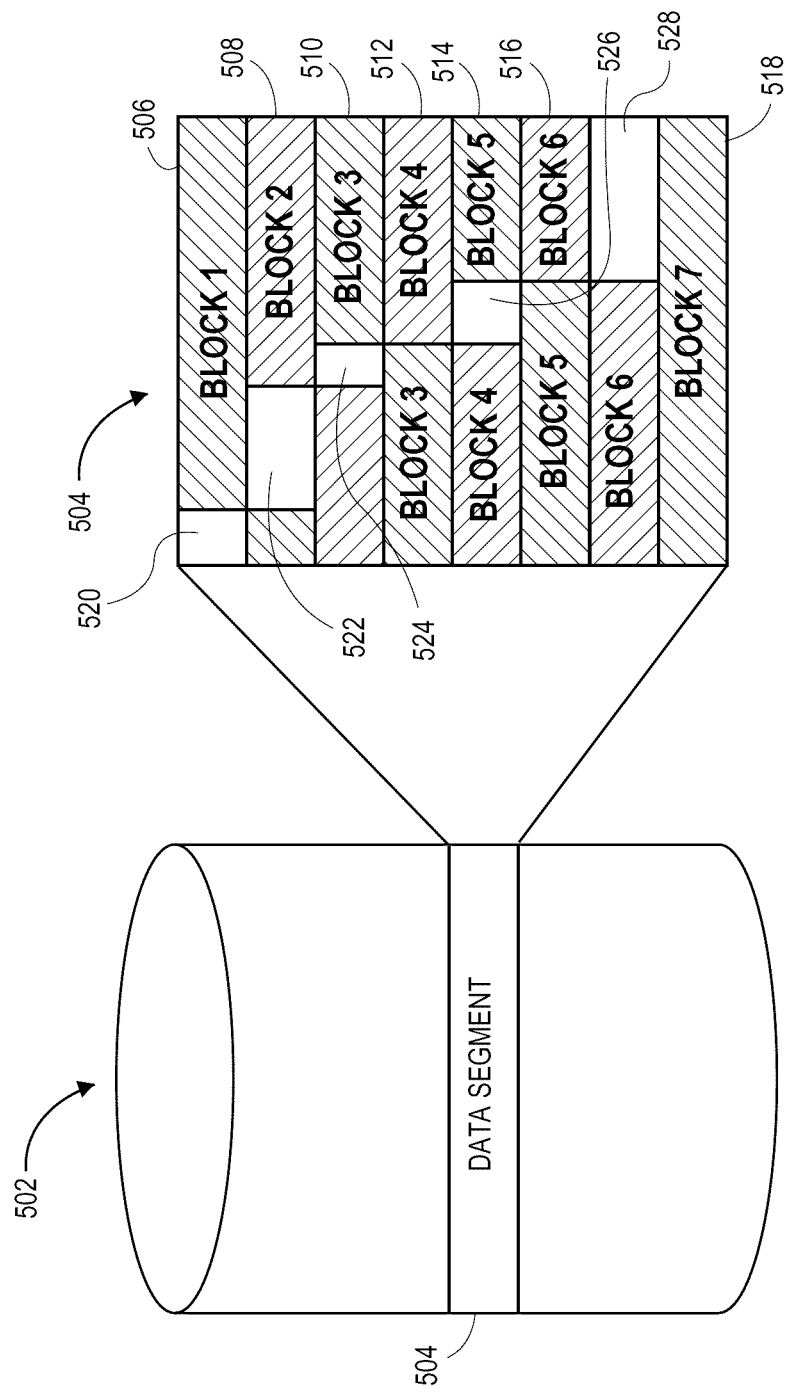
FIG. 5 is a block diagram showing an expanded view of an example data segment including block alignments created in accordance with embodiments described herein.

FIG. 5 illustrates a block diagram of an example memory module 502, including data segment 504, after the deduplication block alignments have been determined. The data segment 504 may be any size, but as an example and not to be construed as limiting, the data segment 504 is 1 MB in size. In addition, as an example and not to be construed as limiting, the deduplication block size is a fixed 128 kB. Thus, the data segment 504 could potentially contain a total of eight deduplication blocks. As described above, with reference to FIGS. 2-4, a block alignment function is performed on the data within a sliding window to produce a block alignment value. The sliding window can be the same size as a deduplication block size. As described above, if the block alignment function returns a hit a deduplication block is established and the sliding window moves relative to the data segment according to the size of the deduplication block. If the block alignment function does not return a hit, the sliding window moves relative to the data segment according to the size of an incremental value. As discussed previously, the incremental value may be any number of different sizes ranging from one data subcomponent or more. A block alignment function is performed on the data within the moved sliding window, and the process continues. FIG. 5 illustrates a data segment after this process has occurred across the entire data segment. Data segment 504 contains various deduplication blocks (506, 508, 510, 512, 514, 516, 518) of fixed size. In this example, the fixed size for each deduplication block is 128 kB. However, as mentioned previously, the fixed size may be any size. The data segment also contains various gaps (520, 522, 524, 526, 528) interspersed between the various deduplication blocks (506, 508, 510, 512, 514, 516, 518). The gaps vary in size depending on the number of unsuccessful outputs of the block alignment function. The more unsuccessful outputs from the block alignment function, the larger the gap.

Reviewing the data segment 504 indicates that there were no hits on the first bytes or other units of data within the sliding window. The first hit occurred at block1 506. No hits occurred between block1 506 and block2 508, resulting in gap 522. The same can be said for gaps 524, 526, and 528. FIG. 5 also illustrates that the block alignment of a data segment 504 will likely result in fewer deduplication blocks being established than could potentially be established. For example, if there was a hit each time a block alignment function was performed on the data within the sliding window, a total of eight would be established. However, usually some amount of data will not return a hit, and thus, there will be fewer deduplication blocks than theoretically possible, with gaps therebetween. In the example illustrated in FIG. 5, only seven deduplication blocks of 128 kB each are established within the 1 MB data segment. Thus, there is 128 kB of gap data.

Figure 6:
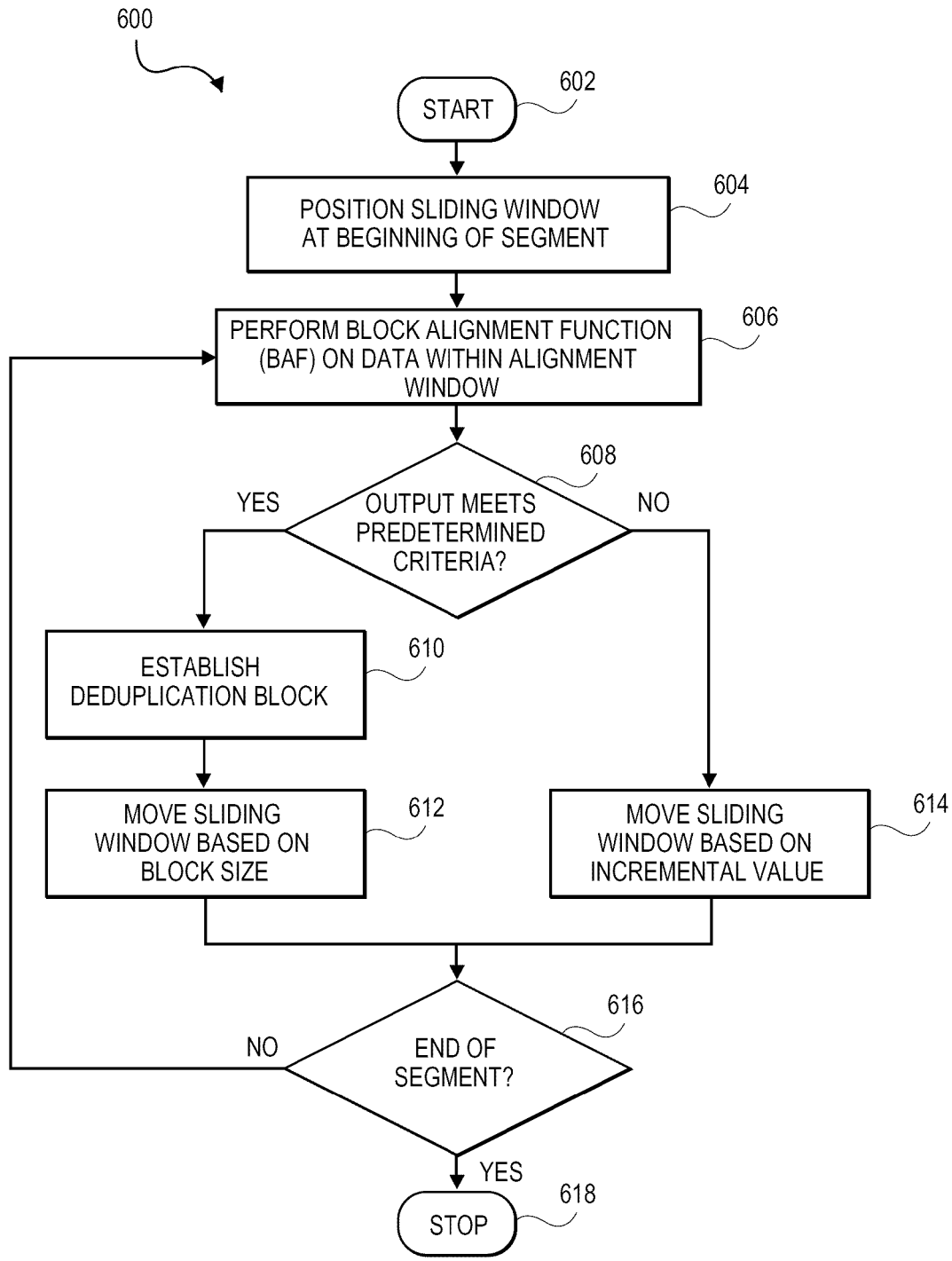
FIG. 6 is a flow diagram illustrative of one embodiment of a routine implemented by a storage system for defining deduplication block alignments within a data segment.
Figure 7:
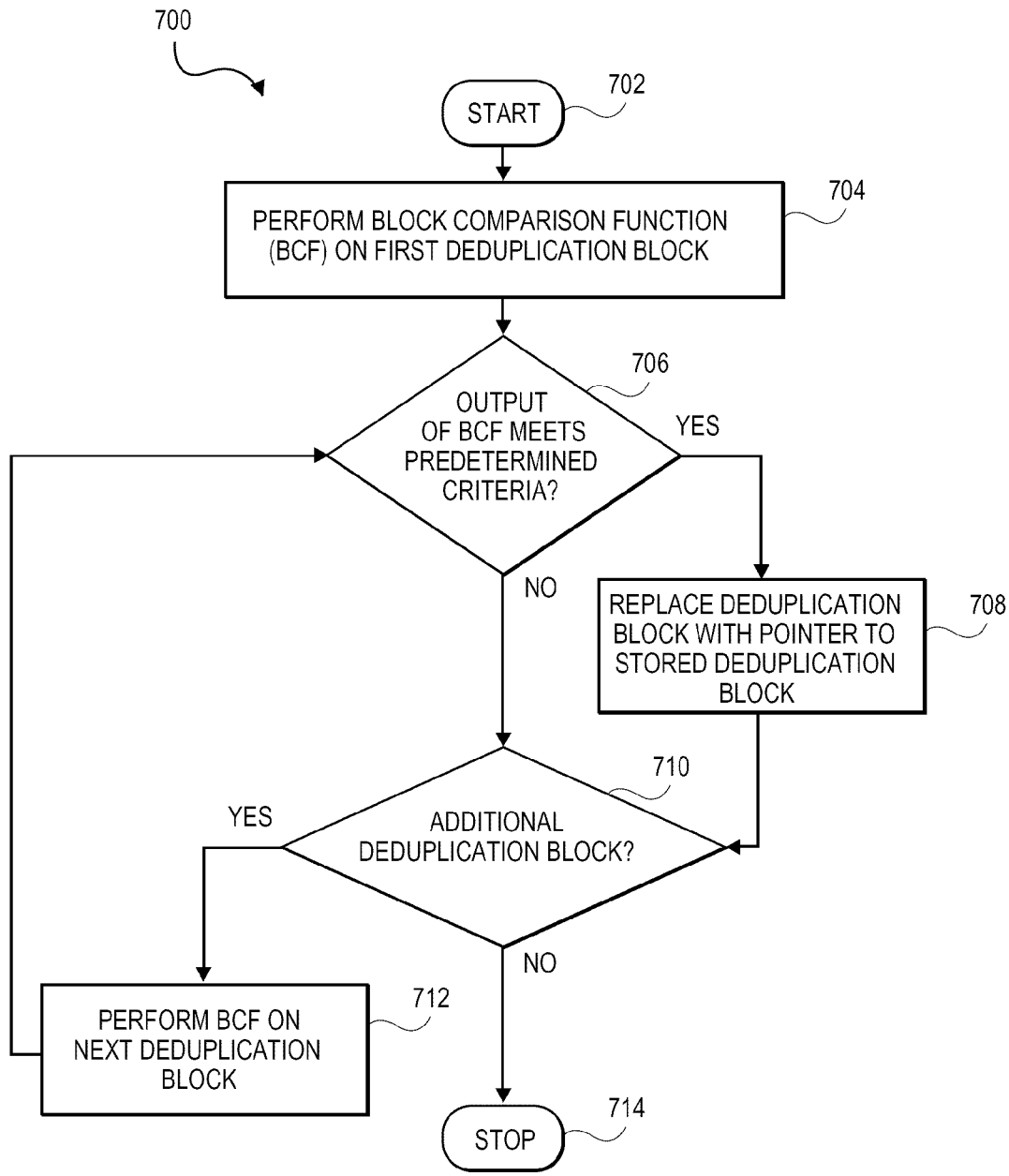
FIG. 7 is a flow diagram illustrative of one embodiment of a routine implemented by a storage system for deduplicating data blocks within a data segment.
Figure 8:
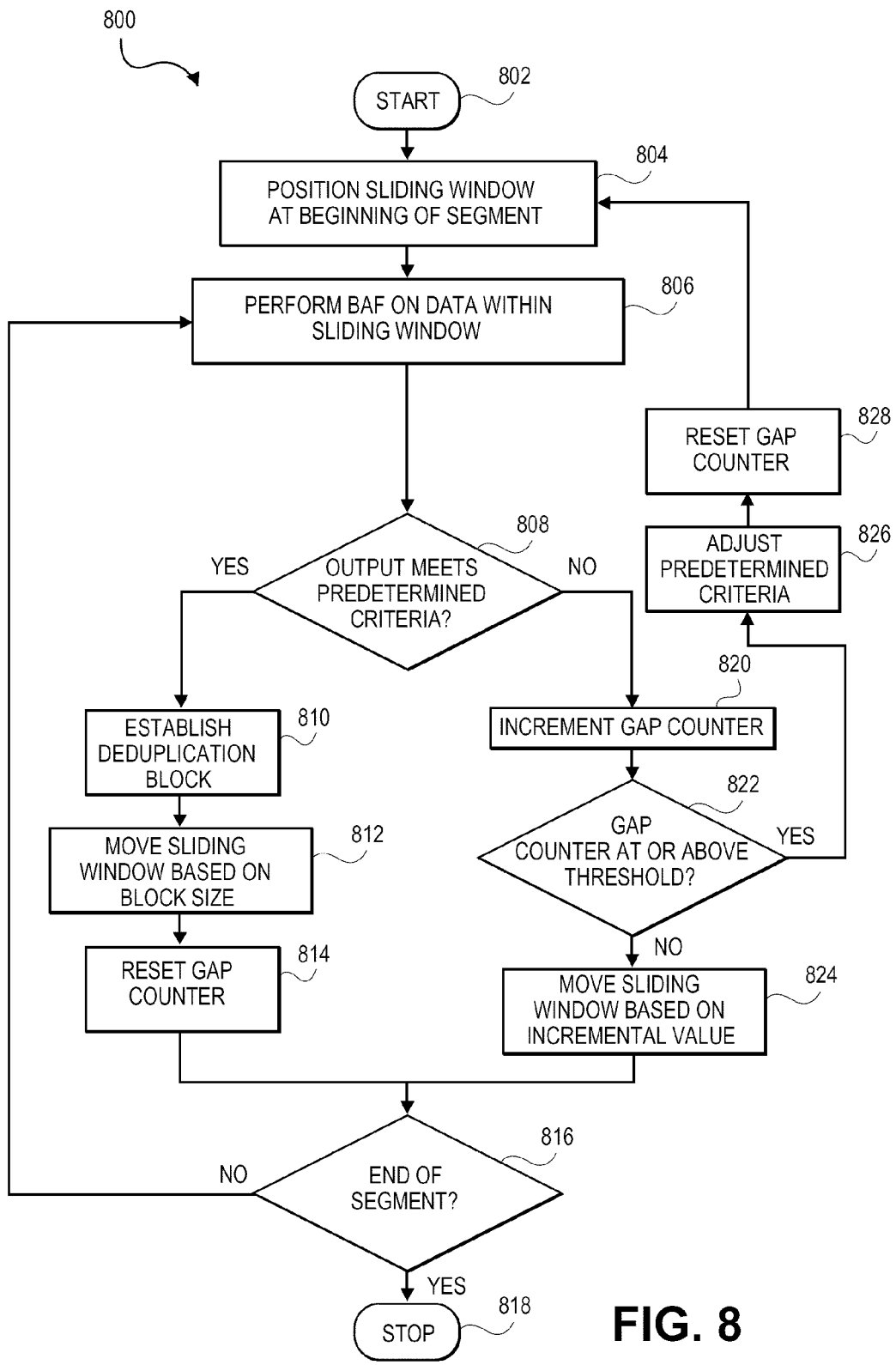
FIG. 8 is a flow diagram illustrative of another embodiment of a routine implemented by a storage system for defining deduplication block alignments within a data segment.
Figure 9:
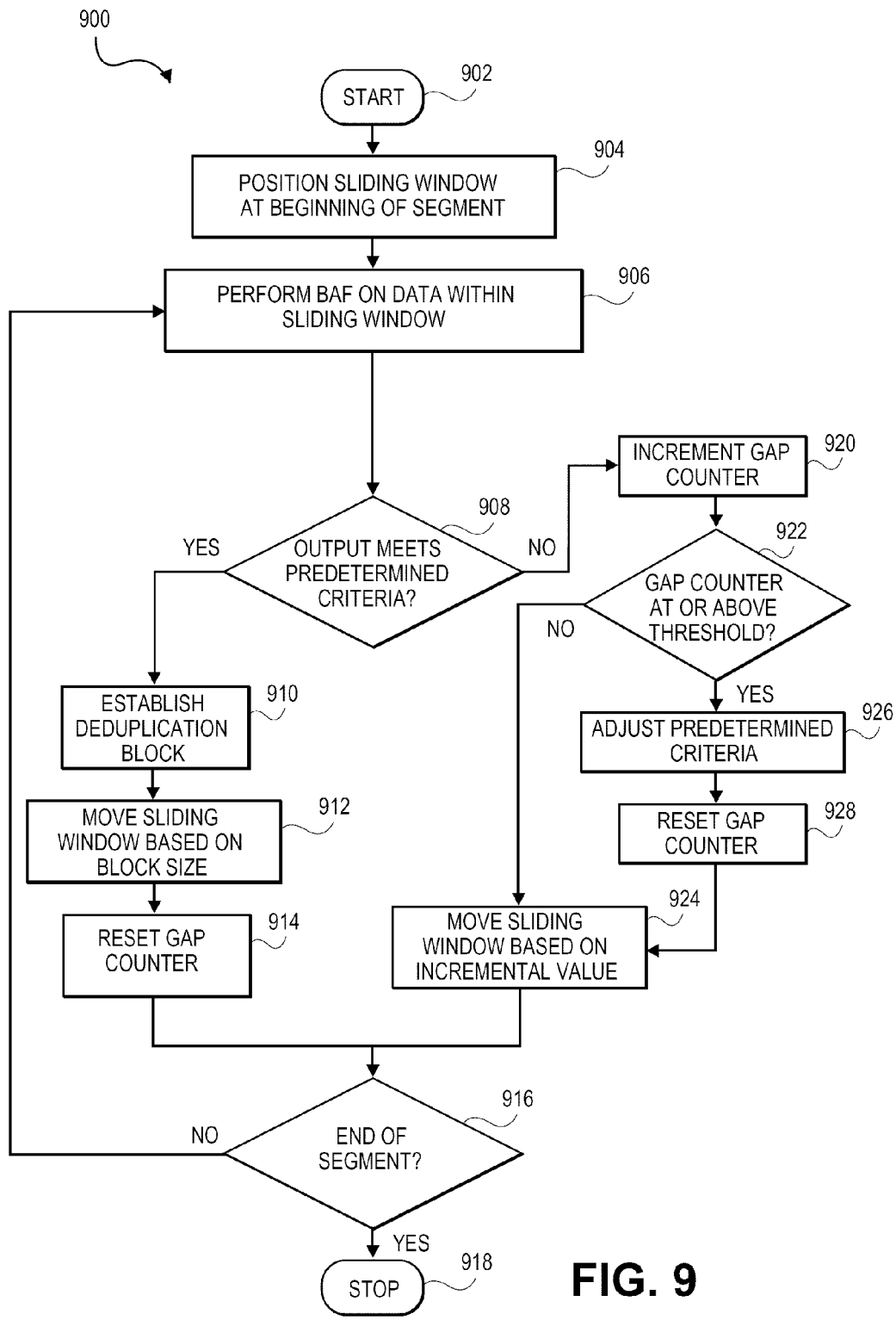
FIG. 9 is a flow diagram illustrative of another embodiment of a routine implemented by a storage system for defining deduplication block alignments within a data segment.
Figure 10:
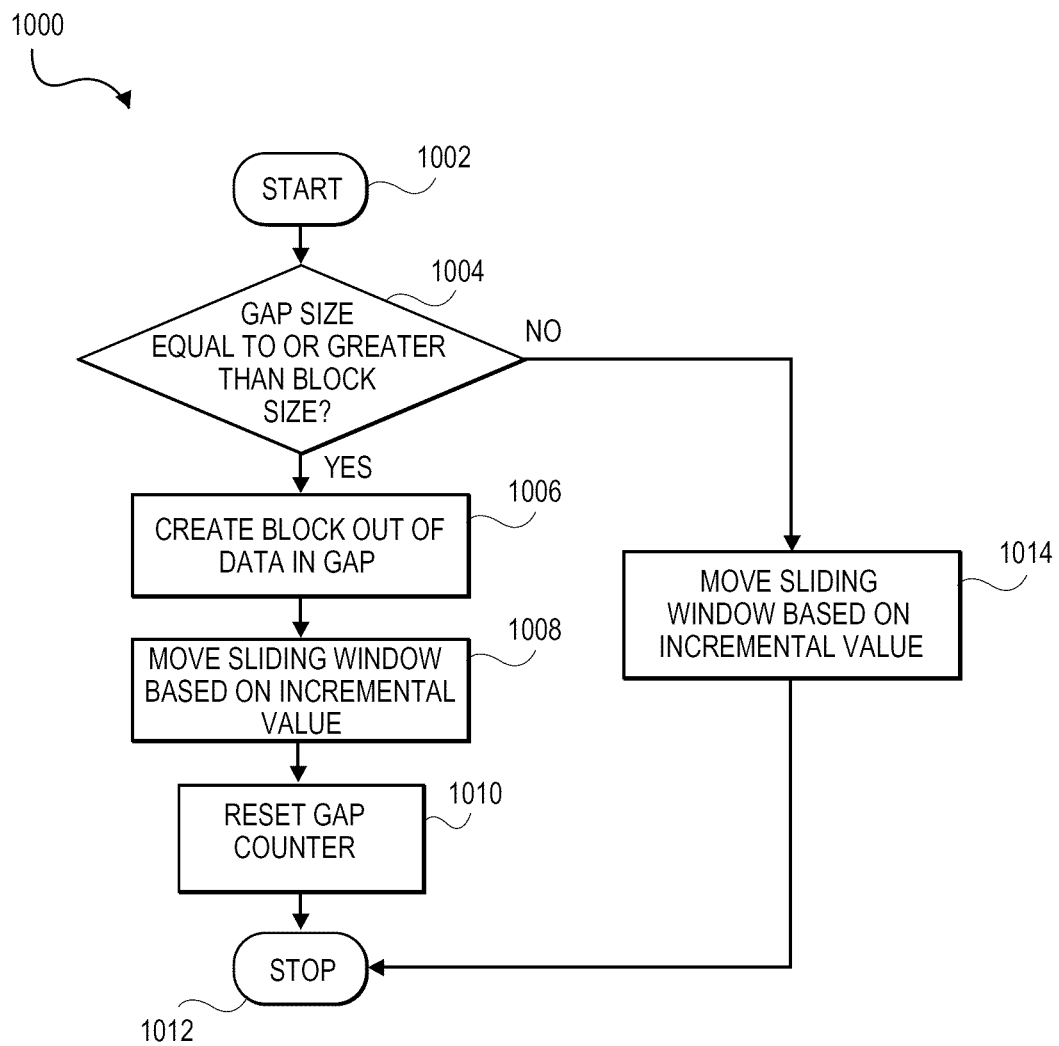
FIG. 10 is a flow diagram illustrative of another embodiment of a routine implemented by a storage system for defining deduplication block alignments within a data segment.

FIGS. 6-10 are flow diagrams illustrative of various processes or routines for defining deduplication block alignments within a data segment. FIG. 6 is a flow diagram illustrative of one embodiment of a routine implemented by a storage system for defining deduplication block alignments within a data segment. FIG. 7 is a flow diagram illustrative of one embodiment of a routine implemented by a storage system for deduplicating data blocks within a data segment. FIG. 8 and FIG. 9 are flow diagrams illustrative of different embodiments of a routine implemented by a storage system for defining deduplication block alignments within a data segment. FIG. 10 is a flow diagram illustrative of another embodiment of a routine implemented by a storage system for defining deduplication block alignments within a data segment. The FIGS. 6-10 will now be described in detail.

FIG. 6 is a flow diagram illustrative of one embodiment of a routine 600 implemented by a storage system for defining deduplication block alignments within a data segment. The storage system may be any one of the components discuss above with reference to FIG. 1. For instance the storage system can be the client 185, the data agent 195, the storage manager 102, or any one of the media agents 105. One skilled in the relevant art will appreciate that the elements outlined for routine 600 may be implemented by one or many storage systems/components. Accordingly, the following illustrative embodiments should not be construed as limiting. In addition, it is to be understood that the order of the blocks may be changed without affecting the nature or scope of the description.

At block 602, the routine is initiated. At block 604 a storage system positions a sliding window at the beginning of a data segment. However, it is to be noted that the sliding window can be placed at any location before, within, or after the data segment. Thus, the initial location of the sliding window before, within, or after the data segment may also be referred to as the beginning of the data segment. As mentioned above, the data segment can be a stream of data or can be data that is stored in computer memory. The computer memory can be any of RAM, ROM, solid-state, tapes, hard-discs, magnetic storage disks, or the like. The storage system can select the beginning of the data segment based on predetermined criteria or may select the beginning dynamically.

Once the sliding window has been positioned at the beginning of the data segment to be analyzed, the storage system performs a block alignment function on the data within the sliding window, as illustrated at block 606. As described above, the block alignment function may be any number of functions that allows the storage system to determine an appropriate alignment. Hash functions may provide one alternative for the block alignment function. The hash function may be either a weak or strong hash function. The type of hash function used can be determined based on the amount of computing resources available, time sensitive nature of the deduplication routine, and the like. As is known in the art, weak hash functions typically require less resources than strong hash functions. Thus, in determining the boundary alignment, a weak hash function may be preferred.

With continued reference to FIG. 6, at decision block 610, the storage system determines if the output of the block alignment function satisfies a predetermined criteria. In one embodiment, the predetermined criteria can be a range of values. For instance, if a hash function is used, a range of values from the potential output values of the hash function may be selected. After the hash function, or other block alignment function, has been performed on the data within the sliding window, if the output of the block alignment function is a value within the range selected, the storage system may determine that the predetermined criteria is met. The range of values may vary depending on the data segment being analyzed and the block alignment function being used.

If the predetermined criteria is met the storage system establishes a deduplication block, as illustrated in block 610. Establishing a deduplication block may include storing any information that would aid in locating the deduplication block. For instance, in one embodiment, the storage system can store the location of the sliding window, the size of the deduplication block, a pointer to or address of the deduplication block, as well as the output of the block alignment function. In another embodiment, the storage system can store a reference to the deduplication block and the size of the deduplication block may be predetermined. In yet another embodiment, the storage system can store the entire deduplication block for later use. Any number of methods may be implemented that allows the storage system to access the data within the established deduplication block without departing from the spirit and scope of the description.

Upon establishing the deduplication block, the storage system moves the sliding window relative to the data segment based on the size of the deduplication block, as illustrated in block 612. As noted earlier, the size of the deduplication block may be predetermined or may be determined dynamically. Moving the sliding window can be accomplished in a number of different ways depending on the data. In one embodiment, the sliding window is a buffer. In this embodiment, moving the sliding window includes changing the data within the buffer with new data to be analyzed. In some embodiments, all of the data within the buffer is replaced, in other embodiments some of the data remains. In another embodiment, the sliding window is a pointer or set of pointers to one or more address locations within the data segment. In this embodiment, moving the sliding window can include changing the address location pointed to by the pointer. In an embodiment where the data is streaming, moving the sliding window can be as simple as analyzing the data currently passing the system. In addition, based on the starting point of the sliding window, the sliding window can move forwards or backwards relative to the data segment.

Furthermore, the sliding window can move in increments larger or smaller than the size of the deduplication blocks. For example, moving the sliding window based on the size of the deduplication block may result in gaps between the newly created deduplication block and the next data within the sliding window, or some data may have the block alignment function performed more than once. If the predetermined criteria is not met, then the storage system moves the sliding window relative to the data segment by an incremental amount, as illustrated at block 614. As mentioned above, the incremental amount may be any one of many different amounts. For example, the incremental amount maybe a bit, a byte, several bytes, hundreds, thousands, or even more bytes depending on the data segment.

Once the sliding window moves relative to the data segment as discussed with reference to either block 612 or 614, the storage system determines if there is more data in the data segment, as illustrated in block 616. If there is no more data in the data segment, the storage system can end the process, as illustrated in block 618. As part of this determination, the storage system can determine if there is sufficient data left with which to make a deduplication block. If there is insufficient data remaining in the segment to make a deduplication block, the storage system can determine that the end of the segment has been reached, even though some data remains, and end the routine, as illustrated in block 618.

If, however, the storage system determines that additional data remains within the data segment, the storage system can continue determining the block alignment for the additional data and perform the block alignment function on the data within the moved sliding window, as illustrated in block 606. In addition, as part of the end of segment determination in determining block 616 if storage system determines that there is sufficient data remaining in the data block to establish only one more data block without any intermediate gaps or gaps at the end of the data block, the storage system can establish a deduplication block without performing a block alignment function.

With further reference to FIG. 6, it is to be understood that the order of the blocks may be changed without affecting the nature or scope of the description, or the routine 600 may be performed with more blocks or fewer blocks. For example, although not illustrated, routine 600 may store the output of the block alignment function as well as the location of the alignment window.

FIG. 7 is a flow diagram illustrative of one embodiment of a routine 700 implemented by a storage system for deduplicating data blocks within a data segment. One skilled in the relevant art will appreciate that the elements outlined for routine 700 may be implemented by one or many storage systems/components. Accordingly, the following illustrative embodiments should not be construed as limiting.

At block 702, the routine is initiated. At block 704, the storage system performs a block comparison function on a first data block. The first data block may be the first established data block from block 610 of FIG. 6. In an embodiment, routine 700 follows routine 600. In such an embodiment, storage system determines block alignments and established data blocks using routine 600, and uses routine 700 to deduplicate the blocks established by routine 600. The block comparison function may be any number of various functions. In one embodiment, the block comparison function may compare each subcomponent of data in two data blocks to determine if the current deduplication data block is equivalent to another, previously stored deduplication data block. For example, the block comparison function may compare the hash of the current deduplication data block to the hashes of previously stored deduplication data blocks. In one embodiment the hash function used may be different from the hash function used in routine 600. For example, in order to reduce or eliminate collisions in which non-redundant data is removed, the hash function can be a strong hash function. In one embodiment, the block comparison function compares the data blocks within the data segment to other data blocks within the data segment. In other embodiments, the block comparison function compares data blocks in one data segment with data blocks in other data segments. Any number of various functions may be used to determine if a data block is equivalent or substantially equivalent to another data block without departing from the spirit and scope of the description.

Once the block comparison function is performed on the data block, the storage system may determine if the output of the block comparison function meets a predetermined criteria. Generally, the predetermined criteria can be whether the output block comparison function indicates that current deduplication block matches another, previously stored deduplication data block, such as where the output is equal to the output for another, previously stored deduplication data block. The value of the output of the block comparison function on the other data block can be stored in computer memory and can be from the same data segment or from a different data segment. For example, the system in one embodiment maintains a table of hash values corresponding to previously stored deduplication data blocks. If the storage system determines that the output of the block comparison function meets the predetermined criteria (e.g., the hash matches that of another stored data block), the storage system replaces the data block with a reference to the other data block. In this manner, the storage system can reduce the overall size of the data segment. Rather than containing all the data from the data block, the data segment will contain a reference to an equivalent data block.

If the output of the block comparison function does not meet the predetermined criteria the storage system can determine if there are additional data blocks, as illustrated in block

710. In addition, after the storage system has replaced a data block with a reference, as illustrated in block 708, the storage system will then determine if there are additional data blocks, as illustrated in block 710. If there are additional data blocks, the storage system can perform the block comparison function on the next data block, as illustrated in block 712. If, however, there are no more data blocks, then the storage system can end the routine 700, as illustrated in block 714.

With further reference to FIG. 7, it is to be understood that the order of the blocks may be changed without affecting the nature or scope of the description, or the routine 700 may be performed with more blocks or fewer blocks. For example, although not illustrated routine 700 may store the output of the block comparison function.

FIG. 8 and FIG. 9 are flow diagrams illustrative of alternative embodiments of routines 800 and 900 implemented by a storage system for defining deduplication block alignments within a data segment. One skilled in the relevant art will appreciate that the elements outlined for routines 800 and 900 may be implemented by one or many storage systems/components. Accordingly, the following illustrative embodiments should not be construed as limiting.

FIG. 8 and FIG. 9 further illustrate alternative embodiments for altering, or refining, the predetermined criteria during deduplication. As mentioned above, refining the criteria as the sliding window moves across the data segment can further increase the likelihood of finding identical data and reducing the amount of memory used by the data segment. At a high-level, the process 800 refines the criteria and then reevaluates at least some of the data within the data segment. This may occur, for instance, when refining the criteria includes changing the block alignment function. The process 900, on the other hand, refines the criteria and continues evaluating the data segment without reevaluating previously evaluated data. This may occur, for example, when refining the criteria includes expanding, or changing, the range considered to be a hit. Generally, any of the alignment criteria adjustment techniques described herein such as those described with respect to any of FIGS. 4, 8 and 9 may be performed by a criteria adjustment module executing on one or more of the components in the system. For example, a criteria adjustment module may be implemented on the storage manager, one or more of the media agents, or a combination thereof.

Blocks 802-812 and blocks 902-912 of FIG. 8 and FIG. 9, respectively, are similar to and correspond with blocks 602-612 of FIG. 6. At block 802 and block 902 the storage system, positions the sliding window at the beginning of a data segment. At blocks 804 and 904, the storage system performs a block alignment function on the data within the sliding window. At decision blocks 808 and 908, the storage system determines if the output of the block alignment function satisfies a predetermined criteria. If the output of the block alignment function satisfies a predetermined criteria the storage system establishes a deduplication block, as illustrated in blocks 810 and 910, and moves the sliding window relative to the data segment based on the size of the deduplication block, as illustrated in blocks 812 and 912.

In blocks 814 and 914, the storage system resets a gap counter, which will be explained in greater detail below. Blocks 816-818 of FIG. 8 and blocks 916-918 of FIG. 9 correspond with block 616-618 of FIG. 6. In blocks 816 and 916, the storage system determines if the end of the segment has been reached. Similar to block 616 of FIG. 6, the storage system may make this determination in any number of different ways. If the storage system determines that the end of the data segment has been reached, the storage system ends the routine, as illustrated in blocks 818 and 918.

Referring now to only FIG. 8, if the storage system determines at determination block 808 that the output of the block alignment function does not satisfy a predetermined criteria, the storage system increments a gap counter, as illustrated in block 820. The gap counter tracks the number of consecutive instances that the data in the sliding window has failed to satisfy the predetermined criteria. As mentioned previously, when the output of the block alignment function satisfies a predetermined criteria the gap counter is reset. Thus, by incrementing each time the output of the block alignment function fails to satisfy the predetermined criteria, the size of the gap between each deduplication block can be monitored. The gap counter may be implemented in hardware or software in any number of ways without departing from the spirit and scope of the description.

With continued reference to FIG. 8, the storage system determines if a threshold number of no-hits has been reached, as illustrated in block 822. In some embodiments, if there have not been enough hits, i.e. there have not been enough outputs from the block alignment function that satisfy the predetermined criteria, it may be beneficial to adjust the predetermined criteria to increase the number of hits within a data segment. Thus, a threshold number of gaps, or no-hits, can indicate when the predetermined criteria should be adjusted.

If at decision block 822, the storage system determines that the gap counter has not reached a threshold number, the storage system moves the sliding window relative to the data segment based on an incremental value, as illustrated in block 824, similar to block 614 of FIG. 6.

On the other hand, if at determination block 822, the storage system determines that the threshold has been reached, the storage system may adjust the predetermined criteria and reset the gap counter, as illustrated in blocks 826 and 828, respectively. In adjusting the predetermined criteria, the storage system may perform any number of tasks, such as increase the range of acceptable values, establish a new range of acceptable values different from the previous range, or can adjust the block alignment function. In one embodiment, the storage system may adjust the block alignment function by using a different hash function. In another embodiment, the storage system can adjust the size of the sliding window.

Upon adjusting the predetermined criteria, as illustrated in block 826, and resetting the gap counter, as illustrated in block 828, the storage system may then position the sliding window at the beginning of the data segment and begin computing the block alignment function from the beginning, as illustrated in block 804. Although not illustrated in FIG. 8, in some embodiments only some of the data within the data segment is reevaluated. For instance, the storage system moves the sliding window to an earlier location within the data segment that is not the beginning of the data segment, or the initial location of the sliding window. An alternative embodiment is also described with reference to FIG. 9, where the sliding window moves based on an incremental value after the criteria is refined.

Blocks 920 and 922 of FIG. 9 correspond with blocks 820 and 822 of FIG. 8. At block 920, the gap counter is incremented. At block 922, the storage system determines if the gap counter has reached a threshold number, similar to block 822 of FIG. 8. Also similar to FIG. 8, if the gap counter has not reached the threshold value, the storage system moves the sliding window relative to the data segment according to an incremental value, as illustrated in block 924 and makes the end of segment determination, as illustrated in block 916, and described in greater detail above.

However, if the storage system determines that the gap counter has reached a threshold value, the storage system adjusts the predetermined criteria, as illustrated in block 926. Adjusting the predetermined criteria may be done in a similar manner as described earlier with reference to block 826 of FIG. 8. The storage system can also reset the gap counter, as illustrated in block 928, and described in greater detail above, with reference to block 828 of FIG. 8.

With further reference to FIG. 8 and FIG. 9, it is to be understood that the order of the blocks may be changed without affecting the nature or scope of the description. In addition, routines 800 and 900 may be performed with more blocks or fewer blocks. For example, although not illustrated routines 800 and 900 may store the output of the block alignment function. In addition, routines 800 and 900 may reset the gap counter before establishing a deduplication block, moving the sliding window, or adjusting the predetermined criteria. Thus, there are various ways of implementing routines 800 and 900 without departing from the spirit and scope of the description.

FIG. 10 is a flow diagram illustrative of another embodiment of a routine 1000 implemented by a storage system for defining deduplication block alignments within a data segment. At block 1002, the routine is initiated. At block 1004, the storage system determines if the gap size is equal to a threshold size. As discussed in greater detail above, the gap counter is able to track the number of no-hits and size of the gap between deduplication blocks. In some instances, the size of the gap between deduplication blocks may be the same as, or larger than a deduplication block. In such a scenario, it can be beneficial to create a deduplication block out of the gap. Thus, at block 1004, the storage system determines if the gap size is equal to or larger than a deduplication block. If the storage system determines that the gap size is not equal to or larger than a deduplication block, the storage system moves the sliding window relative to the data segment based on an incremental value, as illustrated in block 1014, and described in greater detail above with reference to block 614 of FIG. 6.

However, if the storage system determines that the gap size is equal to or greater than a deduplication block, the storage system may establish a deduplication block out of the data in the gap, as illustrated in block 1006. Although not illustrated in FIG. 10, the storage system may also establish a deduplication block out of a portion, or portions, of the data in the gap. The storage system can establish the deduplication block in a manner similar to that described above with reference to block 610 of FIG. 6. The storage system moves the sliding window relative to the data segment based on the size of the newly established deduplication block, as illustrated in block 1008, and described in greater detail above with reference to block 612 of FIG. 6. Although not illustrated in FIG. 10, in some embodiments, the sliding window may not be incremented after a block is created out of the data, or portions thereof. For instance, if a block is created once a gap is the size of a deduplication block, the sliding window may already be positioned in the appropriate location, i.e. over the data that comes after the data in the newly created deduplication block. In other embodiments, the sliding window may be incremented by an incremental value. At block 1010, the storage system can reset the gap counter, as described in greater detail above with reference to block 814 of FIG. 8. At block 1012, the storage system can stop the routine 1000.

It is to be understood that routine 1000 can be implemented independently or as part of any of routines 600, 700, 800, and/or 900. As such, the determination of whether a deduplication block should be established from a gap of data can be done along with the other determinations made in routines 600, 700, 800, and 900. For example, routine 1000 may be inserted in the place of block 614 of FIG. 6, or in other locations within any of routines 700, 800, or 900.

With further reference to FIG. 10, it is to be understood that the order of the blocks may be changed without affecting the nature or scope of the description, or the routine 1000 may be performed with more blocks or fewer blocks. In addition, the blocks of routine 1000 may be performed in parallel or interleaved with the blocks of routines 600, 700, 800, or 900. Thus, there are many ways of implementing routine 1000 without departing from the spirit and scope of the description.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In certain embodiments of the invention, operations disclosed herein can be used to copy or otherwise retrieve data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc., and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A deduplication system configured to determine deduplication block alignments within a data segment, the system comprising:
   one or more computer processors comprising computer hardware;
   a duplication module being executed by the one or more computer processors and configured to:
   select one or more first block alignment indicator values for a deduplication block alignment function;
   iteratively perform the deduplication block alignment function on data within a sliding window of the data segment, wherein the sliding window comprises a sliding boundary;
   establish a deduplication data block based at least in part on a determination that an output of the deduplication block alignment function performed on the data matches one of the one or more first block alignment indicator values, indicating that a deduplication block alignment has been found; and
   deduplicate the deduplication data block; and
   a criteria adjustment module configured to select one or more second block alignment indicator values to replace the one or more first block alignment indicator values based at least in part on a determination that, for a threshold number of the iterative performances of the deduplication block alignment function, the output of the deduplication block alignment function performed on the data within the sliding window does not match any of the one or more first block alignment indicator values, wherein the one or more second block alignment indicator values are used instead of the one or more first block alignment indicator values for subsequent iterations of the deduplication block alignment function.

2. The deduplication system of claim 1, wherein the deduplication module is further configured to iteratively perform the deduplication block alignment function across at least a portion of the data segment again after selecting the one or more second block alignment indicator values.

3. The deduplication system of claim 1, wherein the one or more first block alignment indicator values overlap with the one or more second block alignment indicator values.

4. The deduplication system of claim 3, wherein the one or more first block alignment indicator values is a subset of the one or more second block alignment indicator values.

5. The deduplication system of claim 1, wherein the one or more first block alignment indicator values and the one or more second block alignment indicator values do not overlap.

6. The deduplication system of claim 1, wherein the deduplication data block is a first deduplication block and the deduplication module is further configured to establish a second deduplication data block based at least in part on determining for a second threshold number of iterations that the output of the deduplication block alignment function performed on current window of data does not fall within the one or more first block alignment indicator values.

7. A method of determining deduplication block alignments within a data segment, the method comprising:
   selecting one or more first block alignment indicator values of a deduplication block alignment function;
   iteratively performing the deduplication block alignment function on data within a sliding window in the data segment, wherein the sliding window comprises a sliding boundary;
   determining with one or more computer processors whether an output of the deduplication block alignment function performed on the data within the sliding window falls within the one or more first block alignment indicator values;
   establishing with one or more computer processors a deduplication data block based at least in part on determining that the output of the deduplication block alignment function matches one of the one or more first block alignment indicator values, indicating that a deduplication block alignment has been found; and
   selecting one or more second block alignment indicator values to replace the one or more first block alignment indicator values based at least in part on determining, for a threshold number of the iterative performances of the deduplication block alignment function, the output of the deduplication block alignment function does not match any of the one or more first block alignment indicator values, wherein the one or more second block alignment indicator values are used instead of the one or more first block alignment indicator values for subsequent iterations of the deduplication block alignment function; and deduplicating the deduplication data block.

8. The method of claim 7, further comprising iteratively performing the deduplication block alignment function across at least a portion of the data segment again after adjusting the one or more first block alignment indicator values to the one or more second block alignment indicator values.

9. The method of claim 7, wherein the one or more first block alignment indicator values overlap with the one or more second block alignment indicator values.

10. The method of claim 9, wherein the one or more first block alignment indicator values being a subset of the one or more second block alignment indicator values.

11. The method of claim 7, wherein the one or more first block alignment indicator values and the one or more second block alignment indicator values do not overlap.

12. The method of claim 7, wherein the deduplication data block is a first deduplication block, the method further comprising establishing a second deduplication data block based at least in part on determining for a second threshold number of the iterative performances of the deduplication block alignment function that the output of the deduplication block alignment function performed on current window of data does not fall within the one or more first block alignment indicator values.

13. The method of claim 7, wherein the deduplication data block is a predetermined size.

14. The method of claim 7, wherein the deduplicated data block is stored in one or more memory devices of a backup storage subsystem residing on a storage area network.

15. The deduplication system of claim 1, wherein the deduplication data block is a predetermined size.

16. The deduplication system of claim 1, wherein the deduplicated data block is stored in one or more memory devices of a backup storage subsystem residing on a storage area network.

17. A method of generating a deduplication data block within a data segment, the method comprising:

selecting one or more first block alignment indicator values of a deduplication block alignment function; and iteratively performing the deduplication block alignment function on data within a sliding window in the data segment, the sliding window comprising a sliding boundary;

determining with one or more computer processors whether an output of the deduplication block alignment function performed on the data within the sliding window matches at least one of the one or more first block alignment indicator values, indicating that a deduplication block alignment has been found;

establishing with one or more computer processors a first deduplication data block based at least in part on determining that the output of the deduplication block alignment function matches the at least one of the one or more first block alignment indicator values;

establishing with one or more computer processors a second deduplication data block based at least in part on determining, for a threshold number of the iterative performances of the deduplication block alignment function, that the output of the deduplication block alignment function does not match the at least one of the one or more first block alignment indicator values; and deduplicating at least one of the first deduplication data block or the second deduplication data block.

* * * * *